(12) United States Patent
Zhang et al.

(10) Patent No.: US 10,218,544 B1
(45) Date of Patent: Feb. 26, 2019

(54) ADJUSTABLE ELECTRIC CONTROL EQUALIZATION CIRCUIT OF CABLE TELEVISION NETWORKS

(71) Applicant: Global Technology Inc., Ningbo, Zhejiang Province (CN)

(72) Inventors: Li Zhang, Ningbo (CN); Qikun Huang, Ningbo (CN); Mingjun Bao, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 15/917,244

(22) Filed: Mar. 9, 2018

(30) Foreign Application Priority Data

Dec. 7, 2017 (CN) .......................... 2017 1 1286106

(51) Int. Cl.
| | | |
|---|---|---|
| *H04L 25/03* | (2006.01) | |
| *H04L 1/00* | (2006.01) | |
| *H04L 25/08* | (2006.01) | |
| *H04B 3/14* | (2006.01) | |
| *H04N 7/10* | (2006.01) | |
| *H04L 25/12* | (2006.01) | |

(52) U.S. Cl.
CPC ....... *H04L 25/03019* (2013.01); *H04B 3/145* (2013.01); *H04L 1/0004* (2013.01); *H04L 25/085* (2013.01); *H04L 25/12* (2013.01); *H04N 7/102* (2013.01); *H04L 2025/03439* (2013.01); *H04L 2025/03592* (2013.01)

(58) Field of Classification Search
CPC . H04L 25/03019; H04L 25/12; H04L 25/085; H04L 1/0004; H04L 2025/03592; H04L 2025/03439; H04N 7/102; H04B 3/145
See application file for complete search history.

(56) References Cited

U.S. PATENT DOCUMENTS

| | | | | |
|---|---|---|---|---|
| 4,506,237 A | * | 3/1985 | Matzek .................. | H04B 3/145 330/304 |
| 4,580,260 A | * | 4/1986 | Blackburn ............... | H04B 3/10 370/295 |
| 5,293,405 A | * | 3/1994 | Gersbach .......... | H04L 25/03885 333/18 |

(Continued)

*Primary Examiner* — Jean B Corrielus
(74) *Attorney, Agent, or Firm* — Grossman Tucker Perreault & Pfleger, PLLC

(57) ABSTRACT

The present disclosure discloses an adjustable electric control equalization circuit used for cable television networks. The disclosed adjustable electric control equalization circuit includes one or more electric control equalization modules with adjustable slopes, a control module, and one or more compensation modules. The control module and the one or more electric control equalization modules are electrically connected to control slope change of the one or more electric control equalization modules. The control module and the one or more compensation modules are electrically connected to generate compensation signals based on the slope change of the one or more electric control equalization modules. An output of the one or more electric control equalization modules is electrically connected to an input of the one or more compensation modules to output a combined signal of a sum of signals outputted from the electric control equalization module and the compensation module.

14 Claims, 4 Drawing Sheets

(56) References Cited

U.S. PATENT DOCUMENTS

| | | | | |
|---|---|---|---|---|
| 5,789,993 | A * | 8/1998 | Comte | H04B 3/145 333/167 |
| 6,580,327 | B1 * | 6/2003 | Joffe | H03F 3/45475 330/144 |
| 7,236,550 | B1 * | 6/2007 | Krishna | H04L 25/03025 375/229 |
| 7,683,732 | B1 * | 3/2010 | Blumenkranz | H04B 3/14 333/18 |
| 2007/0052849 | A1 * | 3/2007 | Craddock | H04B 3/145 348/536 |
| 2007/0147478 | A1 * | 6/2007 | Lai | H04B 7/005 375/130 |

* cited by examiner

ADJUSTABLE ELECTRIC CONTROL EQUALIZATION CIRCUIT OF CABLE TELEVISION NETWORKS

TECHNICAL FIELD

The present disclosure relates to the field of cable television networks, and more particularly, to an adjustable electric control equalization circuit of cable television networks.

BACKGROUND

In cable television networks (CATV), the CATV signal suffers from losses during transmission in cables and/or fibers. The attenuation characteristics of cables and/or fibers may increase as the frequency increases. On the other hand, attenuation of signals may increase as the length of cables and/or fibers increases. Different attenuation slopes would be generated for transmission of signals by transmission cables and/or fibers over different distances. Therefore, equalization circuits of different slopes are needed to equalize the attenuation of signals and balance in-band curves such that signals can be transmitted stably with high quality over a long distance.

In downlink amplifiers and nodes, interstage equalization circuits are usually arranged between an intermediate amplifier and a final-stage amplifier of the product. Conventional equalization circuits employ the following schemes. (1) An attenuator of a fixed slope can be used. A detachable equalization module includes an attenuator and peripheral circuits. Equalization modules of different slopes can be substituted in for different transmission cables and/or fibers over different distances. (2) An in-line attenuator of a fixed slope can be used. The peripheral circuits of the in-line attenuator are not integrated with the in-line attenuator, but arranged on a main board. The slope can be changed by detaching or attaching different in-line attenuators from or on the main board to achieve the purpose of compensation. The second scheme is more cost-effective compared to the first, but both schemes require equalization modules or in-line attenuators of different slopes. It is inconvenient to operate according to these schemes, and the demand for the equalization modules or in-line attenuators will also greatly increase as the number of amplifiers and nodes used increases, requiring a great amount on cost and maintenance. (3) A third scheme involves an electric control equalization circuit as shown in FIG. 1. The electric control equalization circuit comprising a digital step attenuator 1a and peripheral circuits is employed. The signal slope of the digital step attenuator 1a of the electric control equalization circuit can be changed remotely or locally with a control module, so that the slope of signal attenuation can be compensated. The control module can be conventional means such as a microcontroller, or a DSP. The third scheme offers substantial enhancements over the first and second schemes in maintenance costs and operation.

However, equalization circuits of existing cable television networks still have the following technical problems: Since the slope of an electric control equalization circuit may swing between 0 dB and 22 dB, when the slope of a digital step attenuator 1a changes, the change of impedance and the intrinsic frequency response characteristics of the circuit would cause the flatness of the signal waveforms of the digital step attenuator 1a for different slopes to vary substantially, affecting the characteristics of the transmission signal.

SUMMARY

The present disclosure is to provide an adjustable electric control equalization circuit for cable television networks.

The disclosed adjustable electric control equalization circuit includes one or more electric control equalization modules with adjustable slopes. The adjustable electric control equalization circuit further includes a control module and one or more compensation modules. The control module and the one or more electric control equalization modules are electrically connected to control slope change of the one or more electric control equalization modules. The control module and the one or more compensation modules are electrically connected to generate compensation signals based on the slope change of the one or more electric control equalization modules. An output of the one or more electric control equalization modules is electrically connected to an input of the one or more compensation modules to output a combined signal of a sum of both signals outputted from the electric control equalization module and the compensation module.

The adjustable electric control equalization circuit for CATV networks of the present disclosure provides adjustable electric control equalization modules of adjustable slopes, compensation modules and control modules. Slope change of the electric control equalization module can be controlled by the control module based on transmission distance of the cable and/or fiber. The control module also instructs the compensation module to generate a compensation signal based on each slope change so that the frequency response characteristics of the circuit can improve, and desired flatness of the signal waveform can be achieved. In other words, the combined signal of the sum of the signals from the adjustable electric control equalization modules and the compensation modules allows for the desired flatness for each slope, improving signal characteristics and signal quality of signals in transmission.

In some embodiments, each electric control equalization module includes a digital step attenuator and a peripheral circuit. The digital step attenuator provides high attenuation precision and linearity along with low power consumption. Signals with large magnitude can be processed by the digital step attenuator. The digital step attenuator is also compatible with computer technology to allow for programmable control.

In some embodiments, an impedance matching module is arranged between each electric control equalization module and each compensation module. Fluctuation of reflection loss can be reduced by switching between the slopes of the electric control equalization module, and the influence on subsequent compensation modules can be reduced during the switching.

In some embodiments, each compensation module includes a frequency selection module and a numerical control adjustable capacitor. Two output terminals of the numerical control adjustable capacitor are connected in parallel with the frequency selection module. The control module and the numerical control adjustable capacitor are electrically connected for adjusting the capacitance of the numerical control adjustable capacitor. The frequency selection module can select a frequency by filtering the output signal of the electric control equalization module to preliminarily optimize the overall frequency response characteristics of the circuit. Then, the numerical adjustable capacitor can be configured on that basis. By adjusting the capacitance value of the numerical control adjustable capacitor to output different compensation values to further improve the frequency response of the circuit and waveform flatness of the signal for each slope associated with the electric control equalization module.

In some embodiments, each compensation module further includes a varactor diode connected in series with the frequency selection module. A digital-to-analogue (DA) conversion unit is externally connected to the control module or integrated within the control module. The control module is electrically connected to the varactor diode through the DA conversion unit for controlling the varactor diode to be at different capacitance values. The numerical control adjustable capacitor as the primary adjusting means is used to coarsely tune frequencies within a wide tunable range. The varactor diode meanwhile serves as a fine-tuning means for high-frequency signals. The signals after final adjustment possess better flatness and higher precision. The configuration is ideal for cable and/or fiber lines which require the output of two consistent waveforms.

In some embodiments, a blocking capacitor is arranged between the varactor diode and the frequency selection module. This arrangement prevents influence of the frequency selection module on capacitance of the varactor diode and allows for stable control from the control module.

In some embodiments, each compensation module further includes a first inductor, a second inductor and a first capacitor. One end of the first inductor is connected to the frequency selection module. The other end of the first inductor is connected to the one end of the blocking capacitor. The other end of the blocking capacitor is connected to a cathode of the varactor diode. The anode of the varactor diode is grounded, and the second inductor and the first capacitor are connected in parallel between the ground and a connecting end connecting the first inductor to the blocking capacitor. This configuration further improves the frequency response characteristics of the circuit.

In some embodiments, a current limiting resistor is arranged between the varactor diode and the DA conversion unit. The varactor diode could operate with a relatively small voltage drop between two ends thereof, so as to keep the current flowing through the varactor diode small enough to provide the overcurrent protection. In some embodiments, each compensation module further includes a third inductor and a second capacitor. One end of the third inductor is connected to a connecting terminal of the blocking capacitor and the varactor diode. The other end of the third inductor is connected to one end of the current limiting resistor. The other end of the current limiting resistor is connected to an output terminal of the DA conversion unit and connected to an end of the second capacitor, and the other end of the second capacitor is grounded. This configuration could help improve the frequency response characteristics of the circuit.

In some embodiments, each frequency selection module includes a fourth inductor, a third capacitor, a fourth capacitor, a first resistor, a second resistor, a third resistor, and a fourth resistor. The fourth inductor and the third capacitor are connected in series in a first branch. The first branch is connected in parallel with a second branch formed by serially connecting the fourth capacitor and the first resistor. The first and second branches are connected in parallel and further connected with the second resistor connected in parallel. The two ends of the second resistor are respectively connected with one end of the third resistor and one end of the fourth resistor, and the other end of the fourth resistor is connected to the other end of the fourth resistor.

In some embodiments, connecting one end of the first inductor to the frequency selection module connects one end of the first inductor to a connecting terminal of the third resistor and the fourth resistor. This configuration allows for better coupling of the branch having the varactor diode with the frequency selection module.

In some embodiments, each electric control equalization module includes a first electric control equalization module and a second electric control equalization module. Each compensation module includes a first compensation module and a second compensation module. The first electric control equalization module and the second electric control equalization module correspond to two non-overlapping ranges of slope changes. The first electric control equalization module is serially connected to the first compensation module and then connected in parallel with a branch formed by the second electric control equalization module and the second compensation module in serial connection, and each of the first electric control equalization module, the second electric control equalization module, the first compensation module and the second compensation module is electrically connected to the control module. The set of the first electric control equalization module and the first compensation module could be responsible for a part of the slope change range with the second electric control equalization module and the second compensation module responsible for the remaining part of the slope change range.

In some embodiments, the range of the slope change for the first electric control equalization module is 0~11 dB, and the range of the slope change for the second electric control equalization module is 12~22 dB.

In some embodiments, the adjustable electric control equalization circuit includes two single pole double throw (SPDT) switches electrically connected to the control module. A first SPDT switch of the two SPDT switches is arranged on input terminals of the first electric control equalization module and the second electric control equalization module, and the second SPDT switch of the two SPDT switches is arranged on output terminals of the first compensation module and the second compensation module. This configuration allows independent operation of the two groups of electric control equalization modules and compensation modules.

REFERENCE NUMBERS 1a digital step attenuator, 1 electric control equalization module, 2 compensation module, 3 control module, 4 impedance matching module, 5 frequency selection module, 6 numerical control adjustable capacitor, 7 varactor diode, 8 DA conversion unit, 9 first electric control equalization module, 10 second electric control equalization module, 11 first compensation module, 12 second compensation module, 13 single pole double throw switch, L1 first inductor, L2 second inductor, L3 third inductor, L4 fourth inductor, C1 first capacitor, C2 second capacitor, C3 third capacitor, C4 fourth capacitor, C5 blocking capacitor, R1 first resistor, R2 second resistor, R3 third resistor, R4 fourth resistor, R5 current limiting resistor.

DETAILED DESCRIPTION

The present disclosure would be described in greater detail with reference to the accompanying drawings and embodiments hereinafter.

Figure 1:
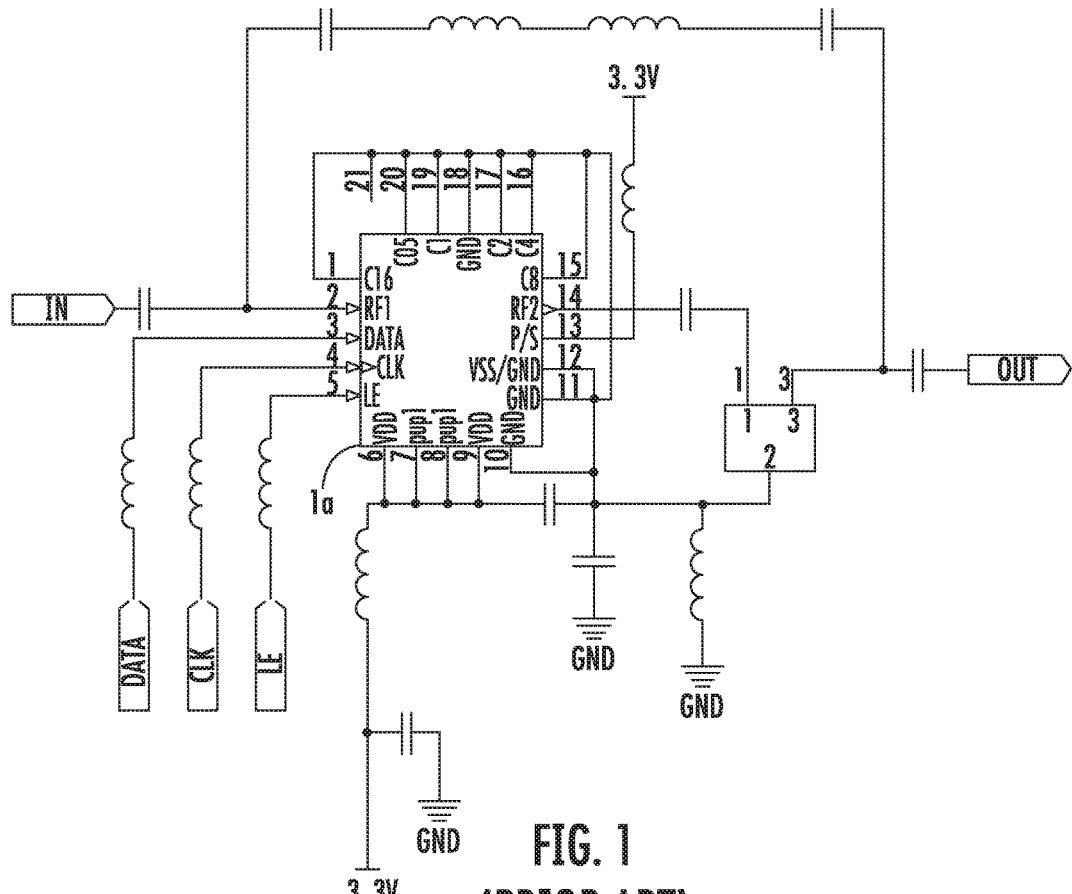
FIG. 1 is a circuit diagram of an electric control equalization circuit of a conventional CATV network.
Figure 2:
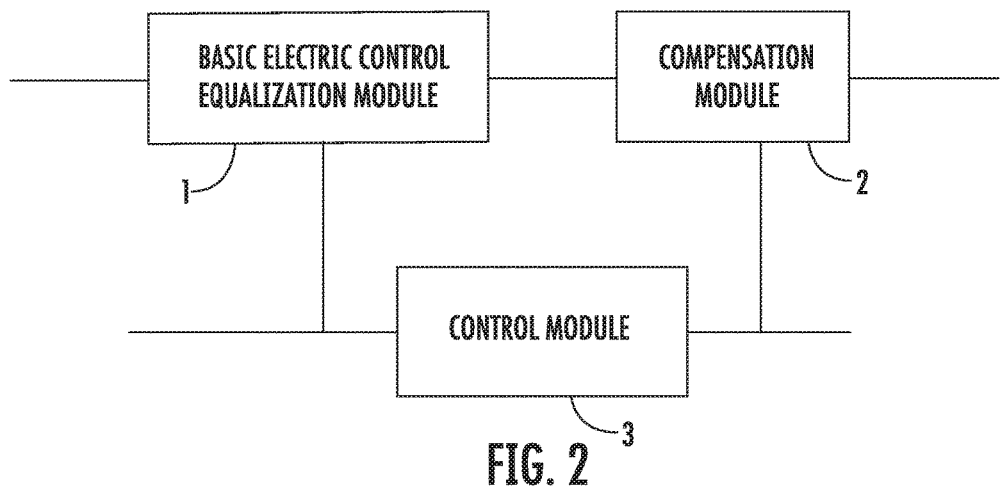
FIG. 2 is a functional block diagram of an adjustable electric control equalization circuit of a CATV network according to a first embodiment of the present disclosure.
Figure 3:
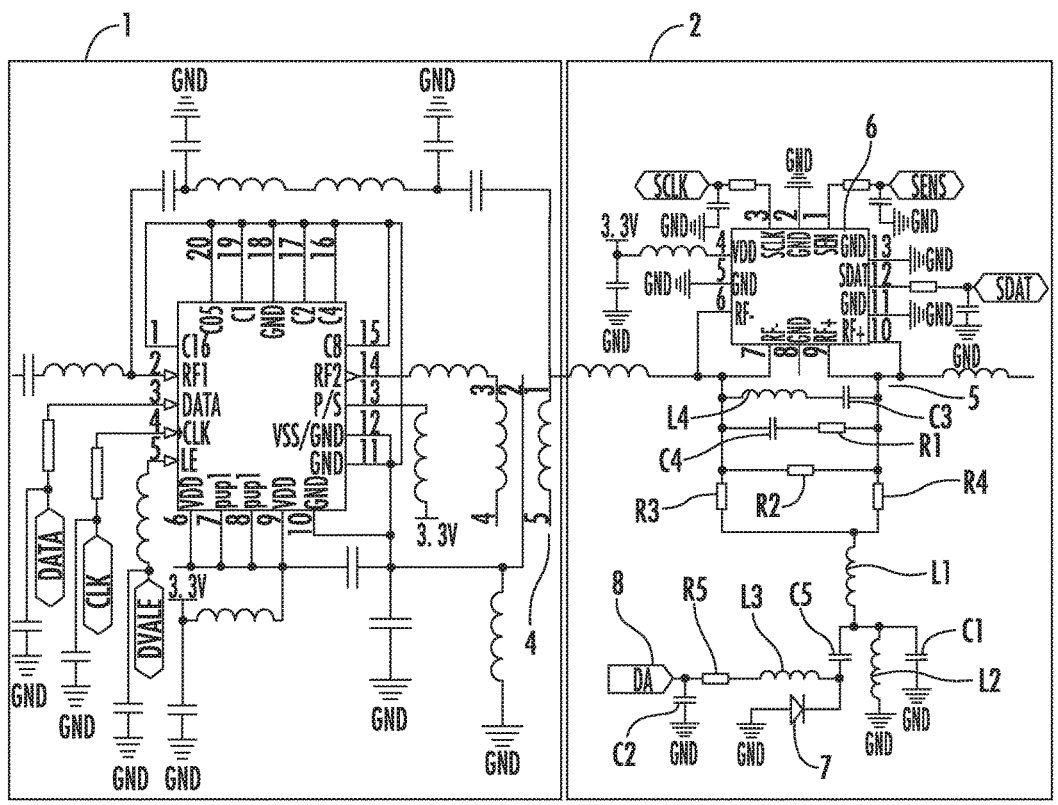
FIG. 3 is a circuit diagram of an adjustable electric control equalization circuit of a CATV network according to a first embodiment of the present disclosure.

In a first embodiment as shown in FIGS. 2-3, an adjustable electric control equalization circuit for CATV networks comprises one or more electric control equalization modules 1 of adjustable slopes, a control module 3 and one or more compensation modules 2. The number of the compensation modules 2 is equal to the number of the electric control equalization modules 1. The control module 3 can be implemented in terms of a microcontroller, DSP, and so on. The control module 3 is electrically connected to the electric control equalization modules 1 for controlling the slope change of the electric control equalization modules 1. The control module 3 is electrically connected to the compensation module 2 for generating a compensation signal based on the slope change of the electric control equalization modules 1. The output of the electric control equalization module 1 is electrically connected to the input of the compensation module 2 to output a combined signal which is a sum of the two generated signals. The combined signal allows for a waveform with desired flatness for various slopes. The slope refers to the difference between the maximum gain and the minimum gain over a certain frequency range. The flatness refers to how closely the relation between the gain and the frequency in a certain frequency range is compared to a linear relation. The concerned frequency range may be typically between 54 MHz and 1218 MHz.

The adjustable electric control equalization circuit for CATV networks according to the present disclosure may include electric control equalization modules 1 with adjustable slopes, compensation modules 2 and a control module. The slope change of the electric control equalization module 1 can be controlled by the control module 3 based on transmission distance of the cable and/or fiber. The control module 3 also instructs the compensation modules 2 to generate a compensation signal based on each slope change so that the frequency response characteristics of the circuit can be enhanced, and desired flatness of the signal waveform can be achieved. Therefore, the combined signal of a sum of a signal from the adjustable electric control equalization modules 1 and a signal from the compensation modules 2 allows for the desired flatness for each slope, improving the signal characteristics and signal quality in transmission of the signals.

In some embodiments, each electric control equalization module 1 comprises a digital step attenuator and a peripheral circuit. The model number of the digital step attenuator can be PE4314. The clock signal CLK, the data signal DATA and the enabling signal LE of the digital step attenuator are electrically coupled to the control module 3. Signals with large magnitude can be processed by the digital step attenuator. The digital step attenuator is also compatible with computer technology to allow programmable control.

In some embodiments, an impedance matching module 4 is arranged between each electric control equalization module 1 and each compensation module 2. The impedance matching module 4 can be one 3.5:3.5 transformer. Fluctuation of reflection loss can be reduced by switching between the slopes of the electric control equalization module 1, which may also reduce the corresponding impact on subsequent compensation modules 2.

In some embodiments, each compensation module 2 includes a frequency selection module 5 and a numerical control adjustable capacitor 6. Two output terminals of the numerical control adjustable capacitor 6 are connected in parallel with the frequency selection module 5. The control module 3 and the numerical control adjustable capacitor 6 are electrically connected for adjusting the capacitance of the numerical control adjustable capacitor 6. The model number of the numerical control adjustable capacitor 6 in one implementation is PE64102. The clock signal SCLK, the data signal SDATA and the enabling signal SEN of the numerical control adjustable capacitor 6 are electrically coupled to the control module 3. The frequency selection module 5 can select a frequency by filtering the output signal of the electric control equalization module 1 to preliminarily optimize the overall frequency response characteristics of the circuit, and then the numerical adjustable capacitor 6 can be configured on that basis. The capacitance value of the numerical control adjustable capacitor 6 could be adjusted to output different compensation values to further enhance the frequency response of the circuit for each slope, so that the signal waveform flatness can be optimized for each slope of the electric control equalization module 1.

In some embodiments, each compensation module 2 further comprises a varactor diode 7 connected in series with the frequency selection module 5. A digital-to-analogue (DA) conversion unit 8 is externally connected to the control module 3 or integrated within the control module 3. The control module 3 is electrically connected to the varactor diode 7 through the DA conversion unit 8 for controlling the varactor diode 7 to be at different capacitance. The numerical control adjustable capacitor 6 as the primary adjusting mechanism is used for coarsely tuning the frequency within a wide tunable range. The varactor diode 7 is more suited for fine-tuning of frequencies in the high frequency range. Combining the numerical control adjustable capacitor 6 and the varactor diode 7 could provide a wide tunable frequency range and render feasible fine-tuning the high-frequency signals. The resulting signals (or post-adjustment signals) may be therefore associated with desired flatness.

In some embodiments, a blocking capacitor C5 is arranged between the varactor diode 7 and the frequency selection module 5. This arrangement prevents influence of the frequency selection module 5 on capacitance of the varactor diode 7, and allows for stable reception of control from the control module 3.

In some embodiments, each compensation module 2 further includes a first inductor L1, a second inductor L2 and a first capacitor C1. One end of the first inductor is connected to the frequency selection module 5. The other end of the first inductor L1 is connected to one end of the blocking capacitor C5. The other end of the blocking capacitor C5 is connected to a cathode of the varactor diode 7. The anode of the varactor diode 7 is grounded, and the second inductor L2 and the first capacitor C1 are connected in parallel between the ground and a connecting end connecting the first inductor L1 to the blocking capacitor C5. This configuration may further improve the frequency response of the circuit.

In some embodiments, a current limiting resistor R5 is arranged between the varactor diode 7 and the DA conversion unit 8. The varactor diode 7 could operate with a relatively small voltage drop between two ends thereof, so as to keep the current flowing through the varactor diode 7 small enough to provide the overcurrent protection.

In some embodiments, each compensation module 2 further includes a third inductor L3 and a second capacitor C2. One end of the third inductor L3 is connected to a connecting terminal of the blocking capacitor C5 and the varactor diode 7. The other end of the third inductor L3 is connected to one end of the current limiting resistor R5. The other end of the current limiting resistor R5 is connected to an output terminal of the DA conversion unit 8 and connected to an end of the second capacitor C2, and the other end of the second capacitor C2 is grounded. This configuration may further improve the frequency response characteristics of the circuit.

In some embodiments, each frequency selection module 5 includes a fourth inductor L4, a third capacitor C3, a fourth capacitor C4, a first resistor R1, a second resistor R2, a third resistor R3, and a fourth resistor R4. The fourth inductor L4 and the third capacitor C3 are connected in series in a first branch. The first branch is connected in parallel with a second branch formed by serially connecting the fourth capacitor C4 and the first resistor RE The first and second branches are parallelly connected, and are in parallel connection with the second resistor R2. The two ends of the second resistor R2 are respectively connected with one end of the third resistor R3 and one end of the fourth resistor R4, and the other end of the third resistor R3 is connected to the other end of the fourth resistor R4. The frequency selection module is designed to be conveniently and simply structured to enhance the frequency response characteristics of the circuit.

In some embodiments, connecting one end of the first inductor L1 to the frequency selection module 5 comprises connecting the one end of the first inductor L1 to a connecting terminal of the third resistor R3 and the fourth resistor R4. This configuration allows for better coupling of the branch having the varactor diode 7 with the frequency selection module 5.

Figure 4:
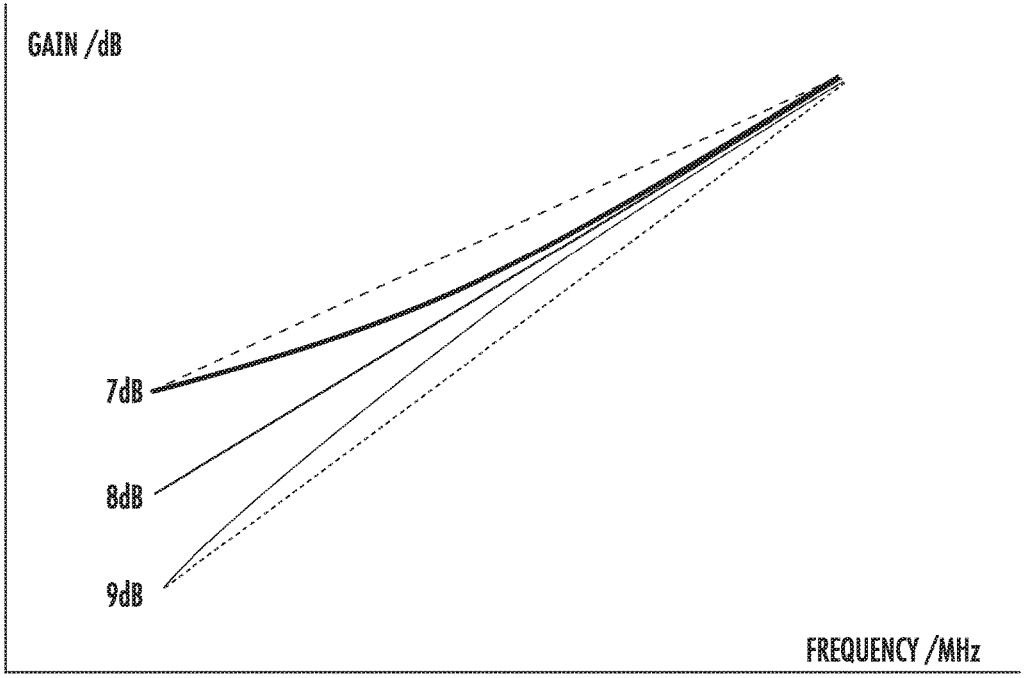
FIG. 4 is an output waveform diagram of an electric control equalization module of the first embodiment at a slope of 7 dB, 8 dB, or 9 dB.
Figure 5:
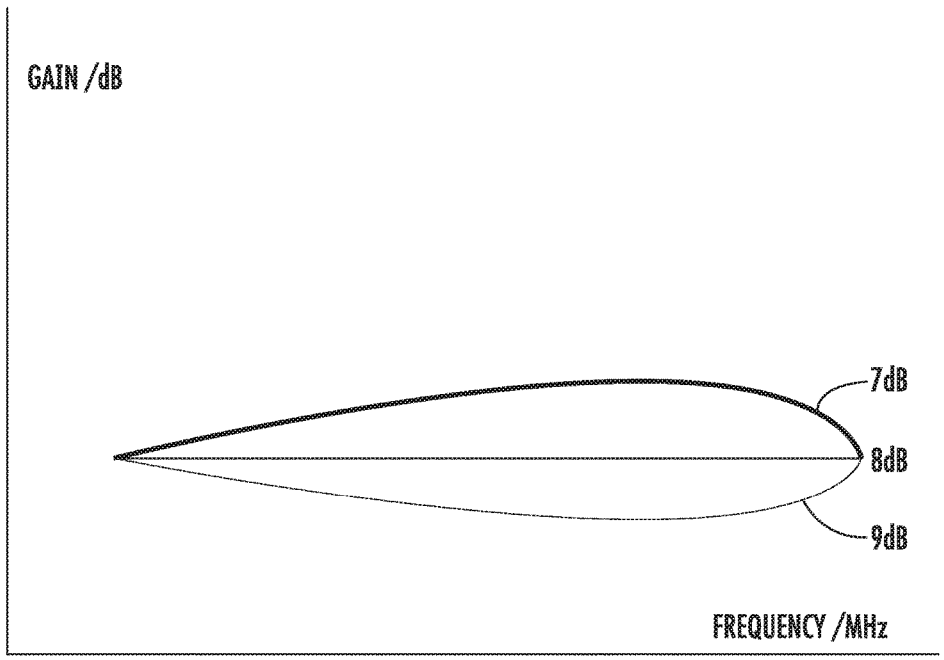
FIG. 5 is an output waveform diagram of a compensation module of the first embodiment at a slope of 7 dB, 8 dB, or 9 dB.
Figure 6:
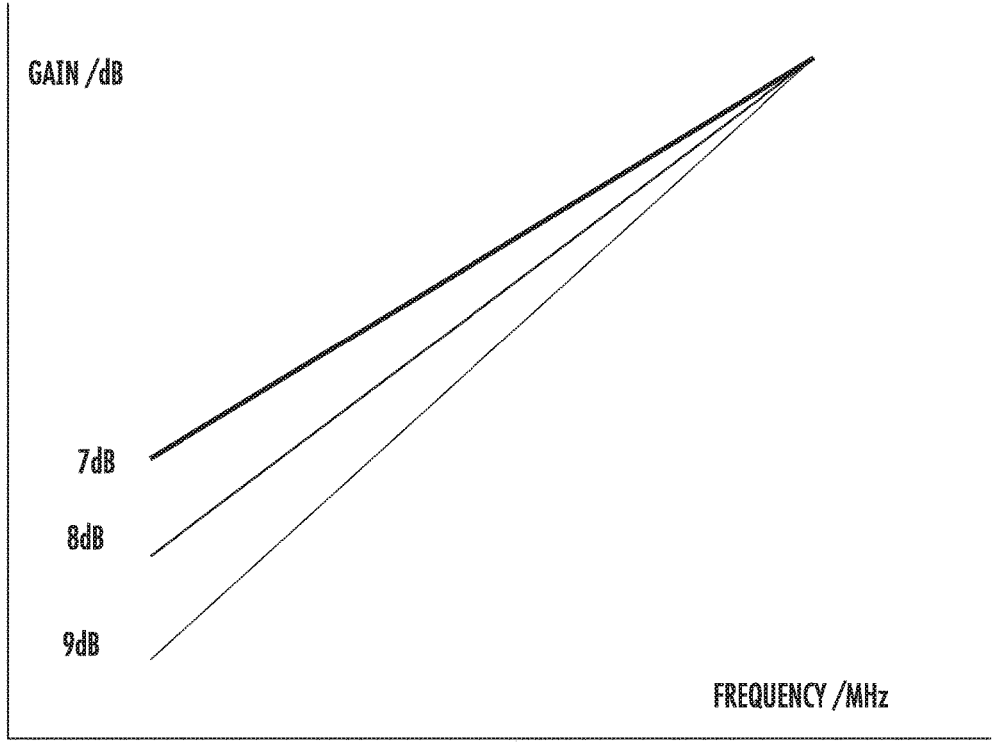
FIG. 6 is a waveform diagram of a combined signal obtained by superimposing an output signal of the electric control equalization module and an output signal of the compensation module at a slope of 7 dB, 8 dB, or 9 dB according to the first embodiment of the present disclosure.

Taking FIG. 4 as an example, the waveform signal obtained by using the electric control equalization module 1 has better flatness if the slope is 8 dB, but the gain curve trends downwards if the slope is 7 dB. If the slope is 9 dB, the gain curve would be a convex curve. With a compensation signal as shown in FIG. 5 after the addition of the compensation modules 2, the recessed waveform at the slope of 7 dB can be compensated through increasing the capacitance value of the numerical control adjustable capacitor 6 and the varactor diode 7. At the slope of 9 dB, the convex waveform can be compensated through decreasing the capacitance value of the numerical control adjustable capacitor 6 and the varactor diode 7. FIG. 6 shows a combined waveform obtained by superimposing an output waveform of the electric control equalization modules 1 and an output waveform of the compensation modules 2. It is shown the waveform flatness at each slope can be improved.

Figure 7:
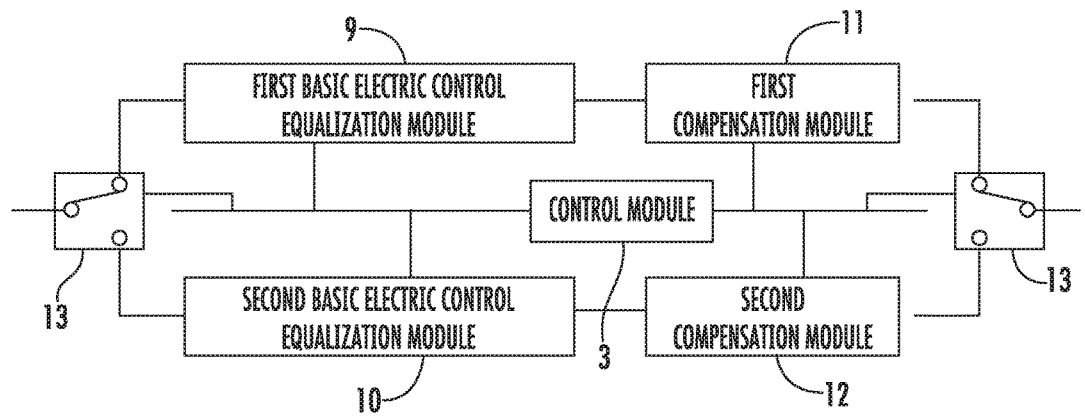
FIG. 7 is a functional block diagram of an adjustable electric control equalization circuit of a CATV network according to a second embodiment of the present disclosure.
Figure 8:
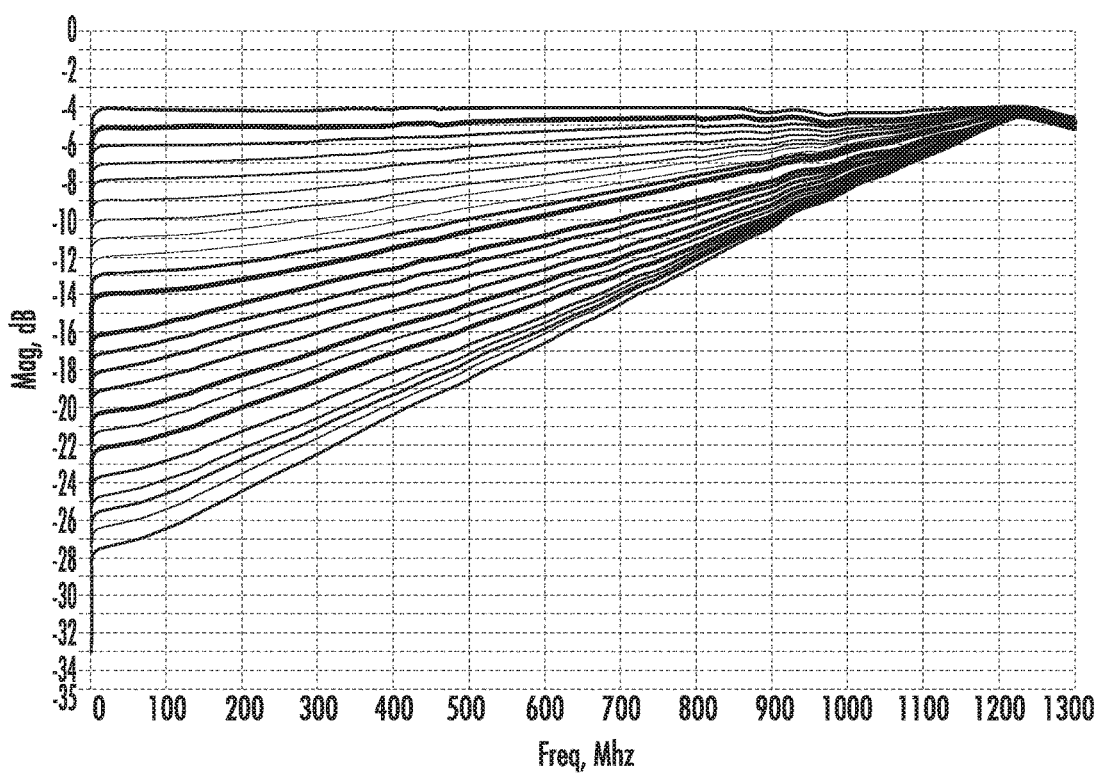
FIG. 8 shows waveform flatness with an adjustable electric control equalization circuit of a CATV network at various slopes according to the second embodiment of the present disclosure.

A second embodiment as shown in FIGS. 7-8 adds the following extra components on the basis of the first embodiment: Each electric control equalization module 1 comprises a first electric control equalization module 9 and a second electric control equalization module 10. Each compensation module 2 comprises a first compensation module 11 and a second compensation module 12. The first electric control equalization module 9 and the second electric control equalization module 10 correspond to two non-overlapping ranges of slope change, respectively. The first electric control equalization module 9 is serially connected to the first compensation module 11 and then connected in parallel with a branch formed by serially connecting the second electric control equalization module 10 and the second compensation module 12, and each of the first electric control equalization module 9, the second electric control equalization module 10, the first compensation module 11 and the second compensation module 12 is electrically connected to the control module 3. A relatively wide range of the slope change can be divided into two segments by this configuration. One set of the electric control equalization module 1 and the compensation module 2 can control the one segment of the slope change range.

In some embodiments, the range of the slope change for the first electric control equalization module 9 is 0~11 dB, and the range of slope change for the second electric control equalization module 10 is 12~22 dB. The first electric control equalization module 9 and the second electric control equalization module 10 may be responsible for unbalanced ranges of the slope changes. More specifically, despite each electric control equalization module 9/10 is responsible for one single 11-dB range in the above embodiment one of the electric control equalization modules may be responsible for, for example, a 10-dB range while the other would be handling a 12-dB slope change range.

In some embodiments, the adjustable electric control equalization circuit comprises two single pole double throw (SPDT) switches 13 electrically connected to the control module 3. A first SPDT switch is arranged on input terminals of the first electric control equalization module 9 and the second electric control equalization module 10, and the second SPDT switch is arranged on output terminals of the first compensation module 11 and the second compensation module 12. This configuration allows for independent operation of the two groups of electric control equalization modules 1 and compensation modules 2.

When the slope is configured as 0-11 dB, the control module 3 controls the two SPDT switches 13 to switch to the upper branch automatically. When the slope is configured as 11-22 dB, the control module 3 controls the two SPDT switches 13 to switch to the lower branch automatically.

FIG. 8 shows waveform flatness at various slopes with an adjustable electric control equalization circuit of a CATV network according to the embodiment of the present disclosure. The range of the slope change is 0-22 dB, while the deviation of slope can be within a range of ±0.5 dB, and the flatness can be within a range of ±0.35 dB.

What is claimed is:

1. An adjustable electric control equalization circuit comprising one or more electric control equalization modules associated with adjustable slopes, wherein the adjustable electric control equalization circuit further comprises a control module and one or more compensation modules, the control module and the one or more electric control equalization modules are electrically connected to control slope change of the one or more electric control equalization modules, the control module and the one or more compensation modules are electrically connected to generate compensation signals based on the slope change of the one or more electric control equalization modules, and an output of the one or more electric control equalization modules is electrically connected to an input of the one or more compensation module to output a combined signal of a sum of signals outputted from the one or more electric control equalization module and the one or more compensation module.

2. The adjustable electric control equalization circuit of claim 1, wherein each electric control equalization module comprises a digital step attenuator and a peripheral circuit.

3. The adjustable electric control equalization circuit of claim 1, wherein an impedance matching module is arranged between each electric control equalization module and each compensation module.

4. The adjustable electric control equalization circuit of claim 1, wherein each compensation module includes a frequency selection module and a numerical control adjustable capacitor, two output terminals of the numerical control adjustable capacitor are connected in parallel with the frequency selection module, and the control module and the numerical control adjustable capacitor are electrically connected for adjusting the capacitance of the numerical control adjustable capacitor.

5. The adjustable electric control equalization circuit of claim 4, wherein each compensation module further comprises a varactor diode connected in series with the frequency selection module, a digital-to-analogue (DA) conversion unit is internally or externally connected to the control module, and the control module is electrically connected to the varactor diode through the DA conversion unit for controlling the varactor diode to be at different capacitances.

6. The adjustable electric control equalization circuit of claim 5, wherein a blocking capacitor is arranged between the varactor diode and the frequency selection module.

7. The adjustable electric control equalization circuit of claim 6, wherein each compensation module further includes a first inductor (L1), a second inductor (L2) and a first capacitor (C1), one end of the first inductor (L1) is connected to the frequency selection module, the other end of the first inductor (L1) is connected to the one end of the blocking capacitor, the other end of the blocking capacitor is connected to a cathode of the varactor diode, the anode of the varactor diode is grounded, and the second inductor (L2) and the first capacitor (C1) are connected in parallel between the ground and a connecting end connecting the first inductor to the blocking capacitor.

8. The adjustable electric control equalization circuit of claim 5, wherein a current limiting resistor is arranged between the varactor diode and the DA conversion unit.

9. The adjustable electric control equalization circuit of claim 8, wherein each compensation module further includes a third inductor (L3) and a second capacitor (C2), one end of the third inductor (L3) is connected to a connecting terminal of the blocking capacitor and the varactor diode, the other end of the third inductor (L3) is connected to one end of the current limiting resistor, the other end of the current limiting resistor is connected to an output terminal of the DA conversion unit and connected to an end of the second capacitor (C2), and the other end of the second capacitor (C2) is grounded.

10. The adjustable electric control equalization circuit of claim 4, wherein each frequency selection module includes a fourth inductor (L4), a third capacitor (C3), a fourth capacitor (C4), a first resistor (R1), a second resistor (R2), a third resistor (R3), and a fourth resistor (R4), the fourth inductor (L4) and the third capacitor (C3) are connected in series in a first branch, the first branch is connected in parallel with a second branch having the fourth capacitor (C4) and the first resistor (R1) serially connected, the first and second branches are connected in parallel and further connected with the second resistor (R2) in parallel, the two ends of the second resistor (R2) are respectively connected with one end of the third resistor (R3) and one end of the fourth resistor (R4), and the other end of the third resistor (R3) is connected to the other end of the fourth resistor (R4).

11. The adjustable electric control equalization circuit of claim 7, wherein each frequency selection module includes a fourth inductor (L4), a third capacitor (C3), a fourth capacitor (C4), a first resistor (R1), a second resistor (R2), a third resistor (R3), and a fourth resistor (R4), the fourth inductor (L4) and the third capacitor (C3) are connected in series in a first branch, the first branch is connected in parallel with a second branch having the fourth capacitor (C4) and the first resistor (R1) serially connected, the first and second branches are connected in parallel and connected with the second resistor (R2) connected in parallel, the two ends of the second resistor (R2) are respectively connected with one end of the third resistor (R3) and one end of the fourth resistor (R4), the other end of the third resistor (R3) is connected to the other end of the fourth resistor (R4), one end of the first inductor (L1) is connected to the frequency selection module, and the one end of the first inductor (L1) is connected to a connecting terminal of the third resistor (R3) and the fourth resistor (R4).

12. The adjustable electric control equalization circuit of claim 1, wherein each electric control equalization module comprises a first electric control equalization module and a second electric control equalization module, each compensation module comprises a first compensation module and a second compensation module, the first electric control equalization module and the second electric control equalization module correspond to two non-overlapping ranges of the slope change, the first electric control equalization module is serially connected to the first compensation module and connected in parallel with a branch formed by the second electric control equalization module and the second compensation module serially connected, and each of the first electric control equalization module, the second electric control equalization module, the first compensation module and the second compensation module is electrically connected to the control module.

13. The adjustable electric control equalization circuit of claim 12, wherein the range of the slope change the first electric control equalization module is responsible for is between 0-11 dB, and the range of the slope change the second electric control equalization module is responsible for is 12-22 dB.

14. The adjustable electric control equalization circuit of claim 12, further comprises two single pole double throw (SPDT) switches electrically connected to the control module, a first SPDT switch of the two SPDT switches is arranged on input terminals of the first electric control equalization module and the second electric control equalization module, and a second SPDT switch of the two SPDT switches is arranged on output terminals of the first compensation module and the second compensation module.

* * * * *